United States Patent [19]

Nelson et al.

[11] 4,179,298
[45] Dec. 18, 1979

[54] FLAME RETARDANT INTUMESCENT POLYAMIDES

[75] Inventors: Linnea E. Nelson; Charles E. Reineke, both of Midland, Mich.

[73] Assignee: The Dow Chemical Company, Midland, Mich.

[21] Appl. No.: 870,312

[22] Filed: Jan. 18, 1978

[51] Int. Cl.² ............................................. C08J 9/02
[52] U.S. Cl. ........................... 106/18.21; 260/29.2 N; 260/29.2 R; 260/31.2 N; 260/32.4; 260/32.8 N; 260/33.2 R; 260/33.4 R; 260/33.8 R; 260/33.8 UA; 260/33.6 R; 521/84; 521/134; 521/135; 521/77; 521/136; 521/138; 521/184; 521/907
[58] Field of Search ............... 528/326, 312, 317, 367, 528/368, 271; 521/77, 907, 134, 135

[56] References Cited

U.S. PATENT DOCUMENTS

| | | | |
|---|---|---|---|
| 3,284,216 | 11/1966 | Kaplan | 106/16 |
| 3,297,754 | 1/1967 | Bentjes | 260/33.4 R |
| 3,312,565 | 4/1967 | Rayner et al. | 260/22 D |
| 3,375,220 | 3/1968 | Clark et al. | 260/29.6 MP |
| 3,396,129 | 8/1968 | Yeodon et al. | 260/33.6 R |
| 3,440,201 | 4/1969 | Sempert et al. | 260/33.6 R |
| 3,449,161 | 6/1969 | Hindersinn et al. | 260/33.6 R |
| 3,562,197 | 2/1971 | Sears et al. | 260/29.6 MP |
| 4,009,137 | 2/1977 | Dany et al. | 260/33.4 R |

*Primary Examiner*—Morton Foelak
*Attorney, Agent, or Firm*—James M. Kuszaj

[57] ABSTRACT

Flame retardant intumescent polyamides comprising repeating structural units of the formulas

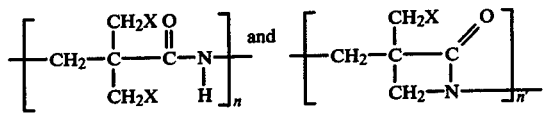

wherein X is independently chloro or bromo, and n and n' are each independently a positive integer are disclosed.

5 Claims, No Drawings

FLAME RETARDANT INTUMESCENT POLYAMIDES

BACKGROUND OF THE INVENTION

The present invention relates generally to polyamides, and more particularly to novel polyamides which exhibit intumescent flame retardant properties, to a process for preparing the polyamides, and to flame retardant coating formulations of the intumescent type containing the novel polyamides.

The importance of protecting building materials and other heat and fire-vulnerable substrates against the effects of high temperatures and flames is widely recognized. The use of flame retardant coating formulations to impart flame retardance to these substrates has been known for several years. A class of these flame retardant coating formulations is formulations of the intumescent type.

Intumescence is a state of being tumid or inflated. An intumescent coating is one that will enlarge or expand to form a cellular structure when exposed to sufficient heat. Coatings of the intumescent type provide protection to heat and/or fire-vulnerable substrates by forming a flame retardant, thermally insulating barrier over the substrate.

The flame retardant coating formulations generally employed in the art are multicomponent materials containing an inorganic flame retardant component, (such as a phosphorous containing compound), a suitable film-forming binder, a dispersing agent, fillers and pigments, and an intumescent component. The intumescent component generally contains two ingredients: (1) a nonresinous chemical material, called a carbonific, which forms a large volume of carbonaceous char, and (2) a chemical material, sometimes referred to as a spumific, which upon thermal decomposition releases large quantities of nonflammable gaseous products. Typical flame retardant formulations of the above type are taught in U.S. Pat. Nos. 3,396,129; 3,440,201; 3,449,161; and 3,562,197.

U.S. Pat. No. 3,297,754 discloses a process for preparing polyamides from α,α-disubstituted β-halopropionic acid amides by way of β-lactams. The polymerization proceeds by a ring opening mechanism and consequently results in polyamide compositions differing in structure from the presently claimed compositions. Moreover, there is no teaching that the polyamides produced by the process of U.S. Pat. No. 3,297,754 exhibit intumescent flame retardant properties.

SUMMARY OF THE INVENTION

The compositions of the present invention are polyamides comprising repeating structural units of the formulas I and II

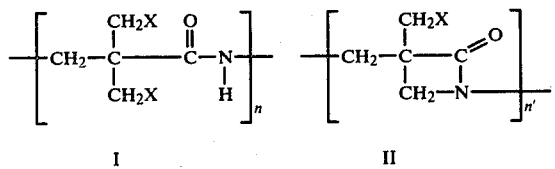

wherein X is independently chloro or bromo, and n and n' are each independently a positive integer.

The polyamides are prepared by contacting an amide selected from the group consisting of 3-halo 2,2-bis(halomethyl)propionamide, 3,3-bis(halomethyl)-2-azetidinone, and mixtures thereof with a base in the presence of a polar organic solvent at a sufficient temperature to form the corresponding condensation polyamide composition.

The present polyamide compositions exhibit unexpected intumescent properties under the influence of sufficient heat, and also liberate flame retardant amounts of gaseous hydrogen halides upon pyrolysis. The polyamide compositions are particularly useful as flame retardant intumescent additives in various coating formulations commonly used to protect heat and/or fire-vulnerable substrates. The compositions of the present invention possess an advantage not possessed by other intumescent additives in that the single polyamide component is capable of functioning as both a flame retardant agent and an intumescent agent. The conventional practice of mixing several different flame retardants and intumescent agents to achieve a flame retardant coating formulation of the intumescent type may thus be avoided.

DESCRIPTION OF THE PREFERRED EMBODIMENT

In the practice of the present invention, an amide is reacted with a suitable base in the presence of a polar organic solvent. The reaction is conducted at a temperature sufficient to produce a polyamide comprising repeating structural units having the formulas I and II.

Suitable starting amides are selected from the group consisting of 3-halo 2,2-bis(halomethyl)propionamide, 3,3-bis(halomethyl)-2-azetidinone, and mixtures thereof. The halo component can be chloro, bromo, or a mixture thereof. Examples of suitable starting amides include 3-bromo 2,2-bis-(bromomethyl)propionamide, 3-chloro 2,2-bis-(bromomethyl)propionamide, 3-chloro 2,2-bis(chloromethyl)propionamide, 3-bromo 2,2-bis(chloromethyl)propionamide, 3,3-bis(bromomethyl)-2-azetidinone, 3,3-bis-(chloromethyl)-2-azetidinone, and mixtures thereof.

In the one embodiment, the starting amide is substantially only 3-bromo 2,2-bis(bromomethyl)propionamide. In another embodiment, the starting amide is substantially only 3,3-bis(bromomethyl)-2-azetidinone.

A number of polar organic solvents can be used in producing the novel polyamides. Suitable polar organic solvents are those capable of dissolving the amide without substantially reacting with it. For example, polar organic solvents such as diethyl ether, tetrahydrofuran, dioxane, 1,2 dimethoxyethane, and the like can be employed. The solvents can be used either alone or as mixtures. Diethyl ether, tetrahydrofuran, and mixtures thereof are preferred.

Any basic material that will abstract protons from the amide functionality to form an anionic amide compound can be used. Suitable bases include sodium hydroxide, potassium hydroxide, sodium methoxide, and the like, either in solid or slurry form. Sodium hydroxide is preferred because of its availability.

A temperature is employed which is sufficient to cause condensation of the polyamide and formation of condensation by-products, such as alkali metal salts and water. In one embodiment, the maximum temperature is below the boiling point of the solvent at atmospheric pressure. For example, when diethyl ether is employed as the solvent, the polymerization reaction is preferably carried out at a temperature below 34.6° C., the normal boiling point of diethyl ether. However, if desired, temperatures in excess of the boiling point of the polar organic solvent can be used.

In general, satisfactory results are obtained when the polymerization reaction is carried out at one atmosphere pressure and at a temperature from about $-10°$ C. to about 100° C. In other embodiments, a temperature of from about 0° C. to about 35° C. is preferred.

The polyamide compositions of the present invention comprise structural units of the formulas I and II repeating in an alternating or in a random sequence. The resulting polyamide compositions are represented by the generalized formula III.

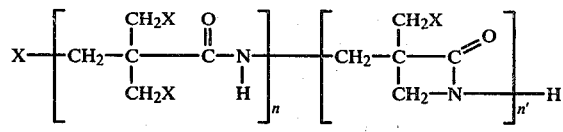

where X is independently chloro or bromo, and n and n' are each a positive integer.

The numerical value of n and n' is such that $$\frac{n'}{n+n'}$$

has a value greater than 0 but less than about 1. Preferably, $$\frac{n'}{n+n'}$$

has a value of from about 0.5 to about 0.8, and most preferably from about 0.7 to about 0.8.

The polyamides are useful as flame retardant and intumescent additives in a variety of coating formulations, such as, for example, in paints. In addition to the polyamide additive, such coating formulations can also contain a film-forming binder, a dispersing agent, and if desired, suitable fillers and pigments.

The film-forming binder of the coating formulations is a resinous or resin-forming component. It can be a liquid, such as a drying oil, or a resin syrup that can be converted to a solid gel by chemical reaction. Suitable film-forming binders are well-known in the art and can include oils, alkyds, cellulosics, acrylics, vinyls, phenolics, epoxies, polyurethanes, silicones, amino resins, latexes, styrene-butadiene, polyvinyl acetates, acrylics, and mixtures thereof.

In solution systems the film-forming binder is dissolved in a solvent. In dispersion systems the resin is in the form of spheres (usually about 10 microns or less in size) suspended in a volatile liquid carrier. The liquid carrier can be water or an organic material. The term "dispersing agent" is used to describe both the solvent and volatile liquid carrier.

The type of film-forming binder employed in the coating formulation determines the type of dispersing agent used in the formulation. Suitable dispersing agents for each type of film-forming binder are well-known in the art. These dispersing agents can include aliphatic and aromatic hydrocarbons, such as naphtha, benzene, and toluene; alcohols, such as, methyl alcohol, ethyl alcohol, and butyl alcohol; ethers, such as dimethyl ether, and ethylene glycol-monoethyl ether; ketones, such as acetone and methyl ethyl ketone; esters, such as ethyl acetate, butyl acetate, and butyl lactate; chlorinated solvents, such as, tetrachloro ethane; nitrated solvents, such as, nitromethane, nitroethane, 1-nitropropane; water, and mixtures thereof.

Various other ingredients normally incorporated into coating formulations can be used without impairing the flame retardant and intumescent properties imparted by the present polyamide compositions. These ingredients may include dyes, pigments, swelling agents, wetting agents, dispersing agents, fungicides, bactericides, fillers, and the like. In general, these ingredients are employed in minor amounts, usually less than about 15 percent by weight of the total weight of the formulation.

The polyamide compositions can be blended into the coating formulations as solid material, or may be dissolved in a suitable organic solvent such as dimethyl formamide, formic acid, and the like prior to addition to the coating formulation.

The coating formulation should contain a sufficient amount of the polyamide composition to impart flame retardance to the heat and/or fire-vulnerable substrates coated with it. A coating formulation containing from about 40 to about 99 percent by weight of a combination of film-forming binder, dispersing agent, and, if desired, fillers, pigments, and other ingredients as discussed above, and from about 1 to about 60 percent by weight of the polyamide composition is preferred. More preferably, the coating formulation contains from about 85 to about 95 percent by weight of a combination of film-forming binder, dispersing agent, and, if desired, fillers, pigments, and other ingredients, and from about 5 to about 15 percent by weight of the polyamide composition.

The resulting flame retardant intumescent coating formulations are suitable for application to substrates that are inherently flammable such as, for example, paper, cardboard, wood, fibrous wallboard, and the like. In addition, the coating formulations are suitable for application to nonflammable substrates such as metal, plasterboard, and the like. When exposed to sufficient heat, the flame retardant coating formulations exert an intumescent flame-retardant effect upon the substrates.

The examples which follow further illustrate the present invention.

EXAMPLE 1

A 100 gram (0.296 mole) sample of 3-bromo 2,2-bis(-bromomethyl)propionamide was dissolved in 150 milliliters (ml) of tetrahydrofuran and 600 ml of diethyl ether. The resulting solution was cooled in an ice bath to a temperature of about 0° C. with continuous stirring. 24.0 grams (0.60 mole) of pulverized sodium hydroxide were added to the stirring solution which turned opaque white following the addition. The resulting reaction mixture was stirred at 0° C. for about 15 minutes, and then gradually allowed to warm to room temperature.

The reaction mixture was maintained at room temperature for about 2 hours. When 150 ml of distilled water were added, a white solid material was formed. The solid was separated from the interface between two liquid phases, and then dried in vacuo to yield 68.7 g of product.

An aqueous phase was separated from a diethyl ether and tetrahydrofuran phase. The aqueous phase was diluted to 500 ml with distilled water. Duplicate 5 ml aliquots were acidified with acetic acid. Eosin red indicator was added, and the aliquots titrated with 0.1 Normal AgNO$_3$ according to the well-known Volhard Method for determinating halide concentration (J. Volhard, *J. Prakt. Chem.*, 117, 217 (1874)). The titration indicated that 345 milliequivalents of bromide ion were displaced by the polymerization reaction.

The white solid product had a softening point of 135° C. Elemental analysis indicated that the product contained 22.9 percent by weight carbon, 2.63 percent by weight hydrogen, 5.90 percent by weight nitrogen, and 56.3 percent by weight bromine. The weight percent bromine of the product was intermediate between the 45.5 percent theoretical bromine content expected if the product contained only structural units of formula II and the 62.3 percent by weight bromine content expected if the product contained only structural units of formula I.

The number average molecular weight of the compound was determined by Gel Permeation Chromatography and was found to be about 647. The weight average was about 1128, with a ratio of 1.74. Thermogravimetric analysis showed about 25 percent weight remaining up to 700° C.

From the foregoing characterization, it was concluded that a polyamide having the structure of formula III, wherein X was bromo, was formed.

EXAMPLE 2

The reaction was conducted substantially as disclosed in Example 1. However, 1.370 g (0.034 mole) of sodium hydroxide was added to 6 g (0.023 mole) of 3,3-bis(bromomethyl)-2-azetidinone, and dissolved in 100 ml diethyl ether and 20 ml tetrahydrofuran. After approximately one hour, 200 ml of distilled water were added. About 3.5 g of a white solid material were removed from the resulting interface. The material was dried, analyzed, and identified as being a compound of general formula III wherein X was bromo. Elemental analysis indicated that the material contained 29.2 percent by weight carbon, 3.07 percent by weight hydrogen, 7.08 percent by weight nitrogen, and 50.9 percent by weight bromine.

The number average molecular weight of the recovered material was about 2110; the weight average was about 2860 with a spread of 1.36; the $Z_{av}$ was 3450. Carbon 13 NMR indicates that $$\frac{n'}{n + n'}$$

was 0.75. The value of n was 25 and the value of n' was 75. The white solid product was soluble in dimethyl formamide, dimethyl sulfoxide, trifluoro acetic acid and partly soluble in formic acid. The solid began to soften at about 133° C.

The aqueous phase which was separated from the reaction mixture was titrated for Br$^-$ with 0.1 Normal AgNO$_3$. The titration indicated that an average of 20.9 meq of Br$^-$ was released in the reaction.

EXAMPLE 3

Preparation of Starting Material 3,3-bis(bromomethyl)-2-azetidinone

To a stirred solution of 24.0 g (0.60 mole) sodium hydroxide and 200 ml of distilled water cooled in ice to 10° C. were added 19.2 g (0.12 mole) bromine. The solution was stirred for five minutes and then 34.0 g (0.10 mole) of 3-bromo 2,2-bis(bromomethyl)propionamide were added. After 1½ hours, the resulting reaction mixture was removed from the ice bath and 24.4 g of a white solid were collected, filtered, washed with mother liquor and water, and then dried in vacuo overnight. The white solid was identified by infrared and nuclear magnetic resonance spectroscopy as 1-bromo, 3,3-bis(bromomethyl)-2-azetidinone.

A 22.4 g (0.067 mole) sample of the 1-bromo-3,3-bis(bromomethyl)-2-azetidinone was dissolved in 450 ml carbon tetrachloride. The insoluble residue (2.0 g) was discarded. A 7 ml (6.07 g, 0.067 mole) portion of toluene was added to the stirred solution. The reaction mixture was irradiated by a 275 watt General Electric Sunlamp and allowed to reflux for one hour. The reaction mixture was decanted hot from a small amount of residue on the stirrer and flask wall and then cooled in ice. White crystals were collected on a filter and dried in vacuo to yield 12.1 g of product. Mother liquor with a few seed crystals was kept cold overnight to yield a second crop of 1.0 g. Total yield of 13.1 g or 76.6% of 3,3-bis(bromomethyl)-2-azetidinone was recovered.

EXAMPLE 4

Use of Polyamide Compositions as Flame Retardant Coating Formulation

One part by weight of the polyamide prepared in Example 1 was crushed to less than 125 microns and then mixed with 9 parts by weight of a white latex paint sold under the trade name Glidden 3080 Fast and Easy Latex Wall Paint. The paint had the following composition: titanium dioxide 8.3 percent by weight, silica and silicates 25.4 percent by weight, vinyl acetate/acrylic resin 5.69 percent by weight, glycol ethers and esters 1.5 percent by weight, additives 1.6 percent by weight, and water 57.6 percent by weight.

The paint formulation was applied to the unfinished side of 6×12 inch samples of 0.5 inch interior wallboard sold under the trade name Celotex in samples of one, two and three coat applications. Similar 6×12 inch samples of Celotex painted with Glidden 3080 White Fast and Easy Latex Wall Paint were used as controls. All samples were allowed to dry under ambient laboratory conditions of temperature and humidity.

A modified version of the Class F Fire Test of Commercial Standards (*Fire Retardant Paints*, American Chemical Society, 1954) was used to test all samples. Each sample was held on a test rack at a 45° angle with the coated side of the sample facing downward. Three-tenths of a cubic centimeter of absolute ethyl alcohol was placed in a flat bottomed steel cup of ⅝ inch internal diameter and 9/32 inch depth. The steel cup was supported so that the center of the base of the cup was 1 inch vertically below a point on the lower side of the test specimen 3 inches from its lower horizontal edge. Thirty seconds after the ethanol test flame was exhausted, any flaming or smoldering of the sample was extinguished. The charred areas were measured by scraping the decomposed material from each specimen, tracing the outline on paper and taking the average of several measurements of the area on paper. Measurements were made with a K&E 4236M compensating Polar Planimeter. The results are shown on Table I.

As can be seen in Table I, a 10 percent by weight formulation of the present polyamide composition in white latex paint applied in one, two or three coats prevented all samples from igniting or smoldering. Control samples with one, two, and three coats burned readily and required water to stop smoldering even after the flame was extinguished.

TABLE I

| | No. Coats | Length of Time of Test Flame (sec) | Sec Sample Burned Alone | Average Area of char (cm$^2$) |
|---|---|---|---|---|
| Controls | 1 | 50 | 30 | 102.9 |
| | 2 | 46 | 30 | 100.3 |
| | 3 | 45 | 30 | 78.0 |
| Treated Samples | 1 | 51 | 0 | 72.2 |
| | 2 | 43 | 0 | 51.6 |
| | 3 | 74* | 0* | 53.2* |

*indicates the sum of two consecutive tests of 31 and 43 sec duration

What is claimed is:

1. An intumescent flame retardant coating formulation comprising from about 40 to about 99 percent by weight of a combination of a film-forming binder and dispersing agent, and from about 1 to about 60 percent by weight of a polyamide composition comprising repeating structural units of the formulas

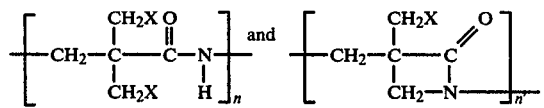

wherein
X is independently chloro or bromo, and n and n' are each independently a positive integer.

2. The flame retardant coating formulation of claim 1, wherein the film-forming binder is selected from the group consisting of oils, alkyds, cellulosics, acrylics, vinyls, phenolics, epoxies, polyurethanes, silicones, amino resins, latex, styrene-butadiene, polyvinyl acetates, and acrylics.

3. The flame retardant coating formulation of claim 1 wherein the dispersing agent is selected from the group consisting of water, aliphatic and aromatic hydrocarbons, alcohols, ethers, ketones, esters, chlorinated solvents, and nitrated solvents.

4. An intumescent flame retardant coating formulation comprising from about 85 to about 95 percent by weight of a combination of film-forming binder and dispersing agent, and from about 5 to about 15 percent of weight of a polyamide composition comprising repeating structural units of the formulas

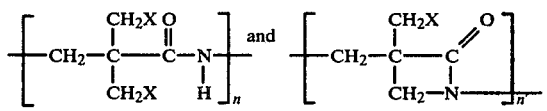

wherein
X is independently chloro or bromo, and n and n' are each independently a positive integer.

5. A fire-vulnerable substrate coated with a fire retardant amount of the coating formulation of claim 1.

* * * * *